United States Patent [19]

Cichetti, Jr. et al.

[11] 3,794,768

[45] Feb. 26, 1974

[54] CROSS-OFFICE CONNECTING SCHEME FOR INTERCONNECTING MULTIPLEXERS AND CENTRAL OFFICE TERMINALS

[75] Inventors: Adam Carroll Carney, Middletown, N.J.; Michael Peter Cichetti, Jr., Staten Island, N.Y.; Joseph George Kneuer, Fair Haven, N.J.; Donald W. Rice, Monmouth, N.J.

[73] Assignee: Bell Telephone Laboratories Incorporated, Berkeley Heights, N.J.

[22] Filed: May 25, 1972

[21] Appl. No.: 256,827

[52] U.S. Cl. ........... 179/15 BA, 179/15 BV, 178/50

[51] Int. Cl. ............................................. H04j 3/12

[58] Field of Search ....... 179/15 AF, 15 BV, 15 BA; 178/50

[56] References Cited

UNITED STATES PATENTS 3,660,606 5/1972 DeWitt .......................... 179/15 BA

*Primary Examiner*—Ralph D. Blakeslee

*Attorney, Agent, or Firm*—R. C. Lipton

[57] ABSTRACT

Interchange of data between two way loops and a data trunk is provided by way of channel units, submultiplexer/demultiplexers and a common multiplexer/demultiplexer. Submultiplexers have five, 10 or 20 ports, creating time frames with corresponding numbers of time slots, all of equal duration. The channel units, which terminate 9.6, 4.8 or 2.4 Kbs data subscribers, assemble the incoming data into bytes, repeat each byte five, 10 or 20 times, respectively, and align each successive one of the repeated bytes with successive time slots. Any port of a five port submultiplexer can be connected to any 9.6, 4.8 or 2.4 channel unit. Similarly, any port of a ten port submultiplexer can be connected to any 4.8 or 2.4 channel unit and any port of a twenty port submultiplexer can be connected to any 2.4 channel unit. The outputs of all submultiplexers are interleaved by the common multiplexer and applied to the trunk. Incoming data from the trunk is distributed to the several submultiplexers/demultiplexers which, in turn, distribute the data to the channel units.

20 Claims, 6 Drawing Figures

CROSS-OFFICE CONNECTING SCHEME FOR INTERCONNECTING MULTIPLEXERS AND CENTRAL OFFICE TERMINALS

FIELD OF THE INVENTION

This invention relates to a time-division multiplex system and more particularly, to a system wherein data signals derived from a data channel are interleaved with the signals from other data channels.

DESCRIPTION OF THE PRIOR ART

When a plurality of data channels or lines are handled by a common facility, it is generally convenient to multiplex the signals from the several lines on a common path or bus. Each incoming line is connected to an input port of the multiplex system. The input ports are sequentially scanned; during each scan cycle or frame a time slot is allocated to each input port; and a data signal from each incoming line is applied to the common bus during the interval defined by the time slot. The multiplex signals on the bus are then transmitted to a remote facility where they are demultiplexed and distributed to various outgoing lines corresponding to the incoming lines at the local facility. Alternatively, if the facility is handling a large number of lines, the input ports are arranged into groups and each group of ports is scanned by a submultiplexer. The signals on the various submultiplexer busses are then interleaved by a common office multiplexer.

In the large facilities, the data subscribers have many and differing requirements. Certain of the signaling lines may be dedicated to a different code format and different signaling rates. Various housekeeping and supervisory signals may have to be transmitted. Advantageously, in the large facility, incoming signaling bits are assembled with locally generated supervisory and housekeeping bits into data bytes. In addition to inserting supervisory and housekeeping information into each byte, the effect of the bit stuffing is to create a byte repetition rate that is the same as the time frame repetition rate of the submultiplexer so that one byte from each port is inserted onto the busses in each time frame, the bits of each byte being serially applied to the bus during the time slot allocated to the input port.

Data subscribers in the large facility desire to be rerouted from time to time; connections to ports are severed and new subscribers connected thereto. Since the data byte assembler differs in operation with the difference in requirements from subscriber to subscriber, it is preferable that the assembler is assigned to the input line circuit and terminal of each subscriber rather than to the submultiplexer input port. To provide office flexibility, however, the assembler must be prepared to present the byte during any one of the time slots (as determined by the input port connected thereto). Moreover, since large physical distances usually separate line circuits and terminals from the office submultiplexers, serial signaling is preferable to minimize the number of wires in the terminal-to-port cross-connection.

Accordingly, it is an object of this invention to provide flexibility in multiplex systems of the above-described type.

It was previously indicated that bit stuffing permits subscribers of differing signaling rates to be accommodated by the same multiplexer; the lower the signaling rate of the subscriber, the greater the number of stuffed bits and the fewer the number of data bits in the byte. If the signaling rate of some subscribers are much lower, one-half or one-fourth the signaling rate of the higher rate subscribers, for example, the corresponding large number of stuffed bits results in wasted transmission time. It is preferable, therefore, that these low rate subscribers be grouped together and assigned a separate submultiplexer. If such subscribers are limited to this "low rate" submultiplexer, however, the office cross-connection flexibility is reduced.

It is therefore another object of this invention to permit low rate subscribers the option of connecting to any submultiplexer.

SUMMARY OF THE INVENTION

In general, line terminals providing bytes having a repetition rate which is the same as the time frame repetition rate of the submultiplexer, repeat each byte a plurality of times equal in number to the number of time-frame time-slots (or the number of submultiplexer input ports) and align each successive one of the repeated bytes with each successive one of the time slots. The submultiplexer, in scanning the repeated bytes applied to each of the input ports, passes to the busses the one repeated byte that is aligned with the time slot allocated to the input port. The terminal can therefore optionally be connected to any port and office cross-connect flexibility is preserved.

Line terminals which provide a byte repetition rate which is one-half the rate of the aforementioned "higher-rate" terminals can connect to a "half-rate" submultiplexer or to the above-described "higher-rate" submultiplexer. The "half-rate" submultiplexer has twice the number of input ports (and time slots/frame) as the "full-rate" submultiplexer and the "half-rate" terminal repeats each byte the same number of times as the number of time slots in the "half-rate" time frame (or twice the number of times as the "higher-rate" terminals), aligning successive bytes with successive time slots. This permits any "half-rate" subscriber to be connected to any port of the "half-rate" submultiplexer. The time slots of the "half-rate" submultiplexer, however, have the same duration and are aligned in time with the time slots of the "higher-rate" submultiplexer, whereby all submultiplexers scan the input ports at the same rate. Therefore, the "half-rate" subscriber can connect to any port of the "higher-rate" submultiplexer, although, since the data byte is repeated twice as many times, the repeated byte appears in each of two successive scans or frames.

In a similar manner, subscribers having a one-fourth signaling rate can connect to a submultiplexer having four times as many ports. Optionally, they can be connected to any port of a "half-rate" or a "higher-rate" submultiplexer.

It is an advantage of this invention that all of the various rate submultiplexers have the same scanning rate and thus equal duration time slots. This enables a conventional office multiplexer to interleave the output data of the several submultiplexers.

The foregoing and other objects and features of this invention will be more fully understood from the following description of an illustrative embodiment taken in conjunction with the accompanying drawings.

DETAILED DESCRIPTION

Figure 1:
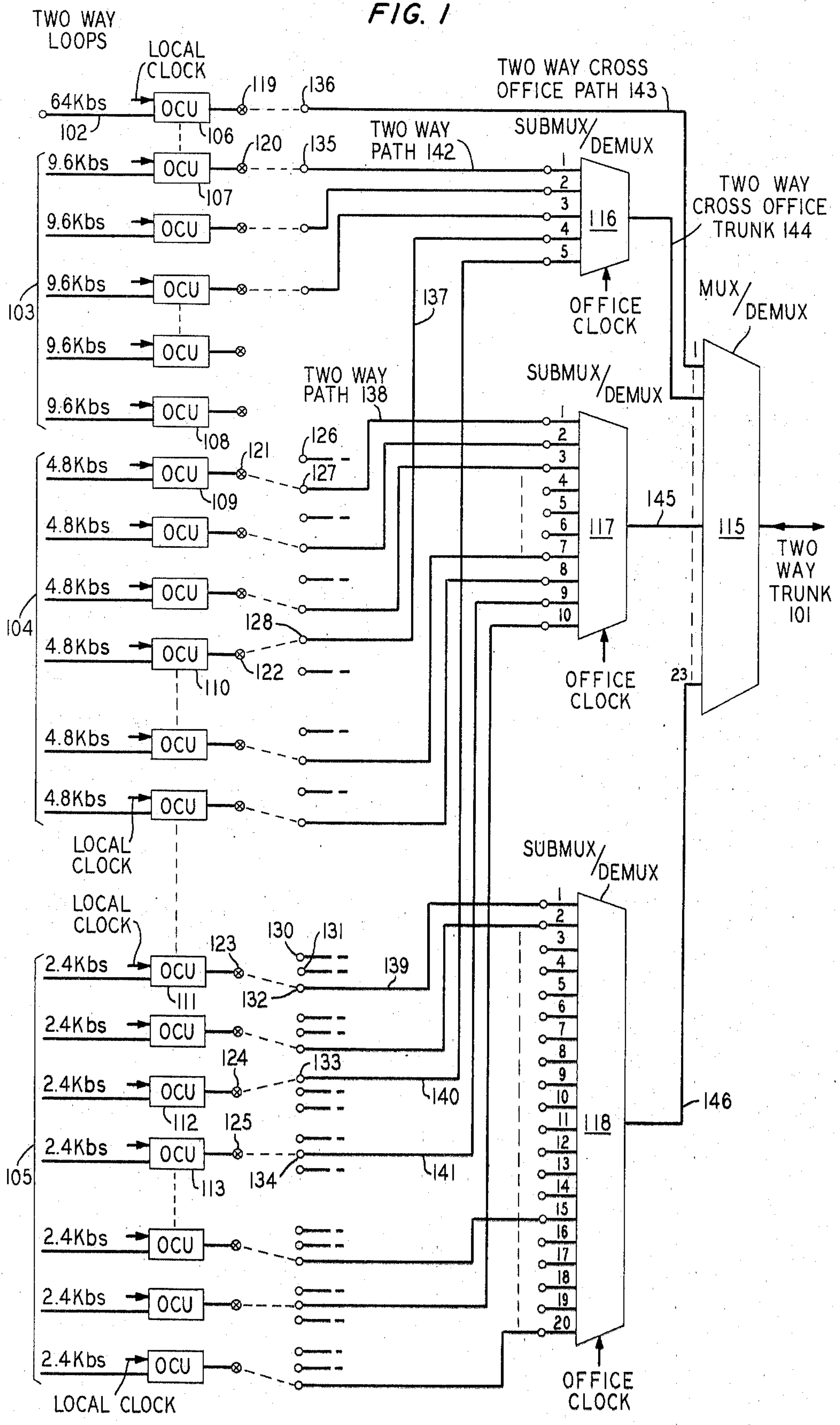
FIG. 1 discloses, in block form, a central office facility arranged in accordance with this invention.

In accordance with a specific arrangement of applicants' invention, a two-way trunk, such as trunk 101 shown in FIG. 1, interchanges data with a plurality of two-way loops, typical ones of the loops being identified as loops 102 through 105. In accordance with one specific arrangement, a set of loops, including two-way loop 102 and other loops not shown, extends to data customers or subscribers who send and receive data at a 64 kilobit per second (Kbs) signaling rate (or, optionally, a 56 Kbs rate); a set of loops, including two-way loops 103, extends to data subscribers having a 9.6 Kbs signaling rate; and two sets of loops, including two-way loops 104 and 105, are connected to 4.8 Kbs and 2.4 Kbs data customers, respectively.

The interchange of data between the two-way subscriber loops and trunk 101 is provided by a plurality of office channel units, typical ones of the units being identified by blocks 106 through 113; groups of submultiplexer/demultiplexers, typical ones being identified by blocks 116 through 118; and multiplexer/demultiplexer 115. Each of two-way loops 102 through 105 terminates in one of office channel units 106 through 113. Digital data from each subscriber is processed through the associated office channel unit, in a manner described in detail hereinafter, and applied to an office channel unit terminal and, conversely, data obtained from each channel unit terminal is processed through the channel unit and applied to the subscriber loop. Typical ones of the terminals are identified in FIG. 1 as terminals 119 through 125.

Terminals 119 through 125 are arranged to be optionally strapped to various cross-office path terminals, such as terminals 126 through 136. Terminals 126 through 136 are, in turn, connected to two-way cross-office paths 137 through 143. In FIG. 1, office channel unit terminal 119 is shown strapped to cross-office path terminal 136, thereby interconnecting office channel unit 106 with two-way cross-office path 143. Similarly, terminal 120 is shown strapped to terminal 135 to interconnect office channel unit 107 to two-way path 142. Other strappings to connect terminals are also shown in FIG. 1.

Returning now to two-way cross-office path 143, this path is connected to multiplexer/demultiplexer 115, and more specifically, to a port identified as port 1. Multiplexer/demultiplexer 115 includes 23 ports and, as described hereinafter, data applied to the several ports is multiplexed and the multiplexed data is transmitted to trunk 101 and incoming multiplexed data on trunk 101 is demultiplexed and distributed to the several ports.

As seen in FIG. 1, two-way paths 137 through 142 are connected to ports of submultiplexer/demultiplexers 116 through 118. Submultiplexer/demultiplexer 116 includes five ports, port 1 being connected to path 142 and the other ports being connected to the other ones of the cross-office paths. The common two-way trunk path 144 of submultiplexer/demultiplexer 116 is connected to an intermediate port of multiplexer/demultiplexer 115. The office may include one or more other five-port submultiplexer/demultiplexers, each having their common two-way trunk path connected to individual ports of multiplexer/demultiplexer 115 and having their ports connected to two-way cross-office paths. The office also includes 10-port submultiplexer/demultiplexers, such as submultiplexer/demultiplexer 117, and 20-port submultiplexer/demultiplexers, such as submultiplexer/demultiplexer 118. The common two-way trunk of submultiplexer/demultiplexer 117 is connected by way of two-way path 145 to a port of multiplexer/demultiplexer 115 and the common trunk path of submultiplexer/demultiplexer 118 is connected by way of two-way path 146 to another port of multiplexer/demultiplexer 115, in this case being identified as port 23.

In accordance with the general organization of the office, each of the 64 Kbs subscribers interchanges data with a port of multiplexer/demultiplexer 115 by way of an office channel unit and each of the subscribers having other signaling rates interchanges data with ports of multiplexer/demultiplexer 115 by way of a submultiplexer/demultiplexer. Advantageously, each of the 9.6 Kbs office channel units, such as office channel unit 107, is optionally connected to one of the five-port submultiplexer/demultiplexers; each of the 4.8 Kbs office channel units is optionally connected to one of the ports of the five-port or 10-port submultiplexer/demultiplexers; and each of the office channel units of the 2.4 Kbs data customers is optionally connected to one of the ports of the five-port, 10-port or 20-port submultiplexer/demultiplexers; and, finally, the common two-way trunks of each of the submultiplexer/demultiplexers are connected to any port of multiplexer/demultiplexer 115. It is obvious that these options provide great flexibility for a central office.

In FIG. 1, terminal 120 is shown strapped to terminal 135, connecting office channel unit 107 with port 1 of submultiplexer/demultiplexer 116 via path 142. Terminal 121, of 4.8 Kbs subscriber's office channel unit 109, may optionally be strapped to cross-office path terminal 126 or 127. Terminal 127, in turn, is connected by way of two-way path 138 to port 1 of submultiplexer/demultiplexer 117. Terminal 126 is advantageously connected by way of a two-way path, not shown, to a five-port submultiplexer/demultiplexer. As seen in FIG. 1, terminal 121 is strapped to terminal 127 and 4.8 Kbs subscriber's office channel unit 109 is, therefore, interconnected with a port of submultiplexer/demultiplexer 117. It is to be understood that terminal 121 may be optionally strapped to various other ones of the terminals connected to two-way paths extending to ports in submultiplexers 116 or 117.

Similarly, terminal 122 of 4.8 Kbs subscriber's office channel unit 110 may be strapped to terminals connected to ports in submultiplexers 116 or 117. As seen in FIG. 1, terminal 122 is connected to two-way path terminal 128 and this latter terminal is connected to a port of submultiplexer/demultiplexer 116 by way of two-way path 137.

An inspection of the office channel units for the 2.4 Kbs subscribers discloses that these units may optionally be connected to a five-port, a 10-port, or a 20-port submultiplexer/demultiplexer. In FIG. 1 it is shown that terminal 123 is strapped to terminal 132, connecting office channel unit 111 to port 1 of submultiplexer/-demultiplexer 118 by way of two-way path 139. Other arrangements are shown for office channel units connected to 2.4 Kbs subscribers, wherein the office channel unit is connected to five- and 10-port submultiplexer/demultiplexers. For example, office channel unit 112 is connected by way of terminals 124 and 133 and cross-office path 140 to submultiplexer/demultiplexer 116. Similarly, office channel unit 113 is connected by way of terminals 125 and 134 and cross-office path 141 to submultiplexer/demultiplexer 117.

In accordance with the specific embodiment disclosed herein, two-way trunk 101 conveys multiplexed data having a signaling rate of 1.544 megabits per second (Mbs). Digital data applied to the various ports of multiplexer/demultiplexer 115, together with certain synchronizing and framing data, is multiplexed in a manner described hereinafter by multiplexer/demultiplexer 115 and then applied to two-way trunk 101. Conversely, incoming multiplexed data on two-way trunk 101 is distributed to the various above-mentioned ports or utilized to obtain synchronizing and framing information. The signaling format of the multiplexed data on trunk 101 can be characterized as byte organized. Advantageously, a byte consists of eight bits of data and, with respect to digital data, all bits of the byte are dedicated to one channel or subscriber.

The multiplexed data on trunk 101 is preferably organized into trunk frames. Each frame consists of 24 bytes, of which 23 bytes are digital data, and one byte is for synchronization and network control. In addition, a framing bit is provided for each frame. Thus, a frame consists of 24 eight-bit bytes plus a framing bit, or a total of 193 bits per cycle.

Incoming multiplexed digital data on two-way trunk 101 (from a remote office, for example) is distributed by multiplexer/demultiplexer 115 to the 23 ports (ports 1 and 23 being identified on the left side of multiplexer/demultiplexer 115, as shown in FIG. 1), a byte at a time. More specifically, the first byte in each frame is passed to port 1, for example, the second byte to port 2, et cetera, down through the twenty-third byte to port 23. Appropriate buffering is provided in each port whereby the bytes are passed onto 23 two-way paths, such as paths 143 through 146, at a 64 Kbs signaling rate. The details of an arrangement for demultiplexing a byte (or character) at a time is disclosed in U.S. Pat. No. 3,466,397, to P. Benowitz et al. on Sept. 9, 1969.

As previously described, data from the various data customers is processed by the office channel units (and, as previously noted, the data from certain groups of customers also multiplexed by the submultiplexer/-demultiplexers) and then applied to the several ports of multiplexer/demultiplexer 115 by way of two-way paths 143 through 146. As described in detail hereinafter, the office channel unit processing is such that the data on all of the cross-office paths is organized into eight-bit bytes at a signaling rate of 64 Kbs and the data thus organized is applied to the several ports 1 through 23 of multiplexer/demultiplexer 115. Multiplexer/-demultiplexer 115 multiplexes the data applied to the several ports, a byte at a time, and applies the multiplexed data to trunk 101. More specifically, during each line frame, a byte from a first port, such as port 1, followed by a byte from a second port and eventually to a byte from a twenty-third port, such as port 23, is applied to two-way trunk 101. During each trunk frame, a 24th byte (designating network control and/or synchronizing information) may also be applied to two-way trunk 101. In addition, a framing bit is applied to two-way trunk 101 to complete a trunk frame of 193 bits. The consequent outgoing signaling rate of two-way trunk 101 is, therefore, 1.544 Mbs. The details of a multiplexer having the capability of multiplexing a byte (or character) at a time is disclosed in the above-mentioned P. Benowitz et al patent.

It is, of course, realized that multiplexer/demultiplexer 115 can employ various types of synchronizing and framing controls, thereby modifying the signaling rate on two-way trunk 101, the only requirement being that the signaling rate on trunk 101 must accommodate the ports connected to the cross-office paths which, in this embodiment, we have assumed to be 23, creating a signaling rate of at least equal to 23 $\times$ 64 Kbs, or 1.472 Mbs. Adding the network byte and the framing bit, the rate becomes 1.544 Mbs.

One function of the interchange of the synchronizing and framing information is to synchronize office clocks. The office shown in FIG. 1 might, of course, contain a master clock and, to synchronize the remote office, synchronizing information would have to be sent to the remote office. Conversely, the master clock may be at the remote office and incoming synchronizing information would be utilized to phase lock the office clock of FIG. 1 to the remote clock. In the specific embodiment disclosed herein, the office clock advantageously provides an 8 kHz signal and a related 64 kHz signal. It is recalled that the framing bit in the multiplexed signal appears once per trunk frame, and therefore has an 8 kHz signaling rate. Accordingly, one might utilize the framing bit to phase lock a 64 kHz clock, which, with appropriate countdown circuitry, also provides an 8 kHz clocking signal. As described in further detail hereinafter, the 64 kHz office clock and the 8 kHz office clock are utilized as the timing signals for the several submultiplexer/demultiplexers. The office clocks, in addition, are employed to phase lock the subscriber loop local clocks, as described in further detail hereinafter. Appropriate timing waves for the 8 kHz clock and the 64 kHz clock are shown as timing waves A and B, respectively, in FIGS. 4A and 4B. It was previously noted that the cross-office signaling format was organized into eight-bit bytes at a 64 Kbs signaling rate. As described in detail hereinafter, the 64 kHz office clock controls the bit signaling rate and the 8 kHz office clock aligns the bytes so that the byte intervals on all cross-office paths coincide in time. A timing wave representing the eight-bit byte organization is shown as wave C in FIGS. 4A and 4B. The alignment of the byte intervals is depicted below wave C, five successive byte intervals being identified as intervals $Y_1$ through $Y_5$.

Each of the office channel units processes the data so that incoming data from the subscriber is organized into eight-bit bytes and converted to a signaling rate of 64 Kbs and outgoing data is recovered from the byte organized 64 Kbs data on the cross-office paths and converted to the customer's signaling rate. Retiming of the incoming and outgoing data is provided by one or more local clocks phase locked to the central office reference clocks, as previously indicated. With respect to the incoming data, each office channel unit aligns the bytes, organized therein, with the office byte intervals. The bytes from the various office channel units therefore coincide in time.

We have previously noted that one group of subscribers has the capability of signaling at a 64 Kbs rate, a two-way loop of such a subscriber being designated by loop 102. Office channel unit 106, therefore, does not have to provide any conversion of the signaling rate to retime the subscriber's data and apply that data to cross-office path 143. It is contemplated, however, that office channel unit 106 might be connected to a 56 Kbs subscriber. In that event, each eight-bit byte assembled by office channel unit 106 includes seven data bits from the subscriber and a flag bit inserted by the office channel unit for network control. The eight-bit byte is then aligned in the common byte interval and applied to two-way cross-office path 143. Conversely, data on two-way cross-office path 143 directed to office channel unit 106 is recovered by detecting the seven bits of data in the eight-bit byte, sending the seven bits on to the local subscriber. Although the details of office channel unit 106 are not disclosed herein, the manner of retiming the data, assembling the data into eight-bit bytes, and the arrangement for inserting a flag bit in the byte is advantageously the same arrangement provided by the office channel units of lower bit rate subscribers, which arrangements are described in detail hereinafter.

A 9.6 Kbs office channel unit, such as office channel unit 107, provides two principle steps in converting data having a 9.6 Kbs signaling rate to eight-bit byte organized data having a 64 Kbs signaling rate. The first step is to organize eight-bit bytes. This involves assembling six data bits received from the customer and inserting a bit for framing and a flag bit for network control. The second step is to repeatedly apply the eight-bit byte to two-way path 142 at the cross-office signal rate of 64 Kbs. Office channel unit 107, being connected to a 9.6 Kbs customer, applies the byte five times to two-way path 142, all of the five bytes being aligned within the common office byte intervals. As a result of inserting or stuffing two bits into the byte and then repeating the byte five times, the signaling format on the two-way path is organized into eight-bit bytes at a 64 Kbs signaling rate.

Data on two-way cross-office path 142 is recovered by office channel unit 107 by selecting one out of five bytes and detecting the six data bits in the recovered byte. The data bits are then transmitted to the subscriber at the subscriber's rate.

A 4.8 Kbs office channel unit, such as office channel unit 109, converts data from a 4.8 Kbs subscriber to the common cross-office path signal format by building each byte from six data bits from the subscriber, a framing bit and a network control flag bit. Each byte is then repeated ten times and applied to the two-way path which, in this case, is path 138. Repetition of the byte ten times produces the eight-bit byte organization at the 64 Kbs signaling rate. Office channel unit 109 similarly employs the local clock to align each of the bytes with the office byte interval. Office channel unit 109 recovers the data on two-way path 138 by selecting one out of ten bytes on the cross-office path, detecting the six data bits therein and transmitting to the subscriber the six bits at the subscriber's signaling rate.

In a similar manner, a 2.4 Kbs office channel unit, such as office channel unit 111, develops bytes by utilizing six bits of the data from the 2.4 Kbs subscriber and inserting a framing bit and a flag bit. The developed byte is then repeated 20 times and passed on to the cross-office path by office channel unit 111. The resultant cross-office signal is thereby organized into eight-bit bytes at the 64 Kbs signaling rate. Conversely, cross-office data is reconverted to the 2.4 signaling rate by detecting one out of 20 bytes, recovering the six bits designating the data, and transmitting these six bytes to the subscriber at the 2.4 Kbs signaling rate.

An important feature is that all cross-office signaling is organized into eight-bit bytes and the bytes on all of the paths are aligned into common byte intervals. This permits a cross-office path to be connected into any port of a submultiplexer/demultiplexer or into any port of multiplexer/demultiplexer 115.

It was previously pointed out that 9.6 Kbs office channel units, 4.8 Kbs office channel units and 2.4 Kbs office channel units may be connected to one of the ports of submultiplexer/demultiplexer 116. As described hereinafter, submultiplexer/demultiplexer 116 interleaves the bytes applied to its five ports and applies the interleaved bytes to its common two-way trunk 144. Under the timing control of the office clock, submultiplexer/demultiplexer 116 selects a byte from one port, such as port 1, during the common office byte interval and then selects a byte from the next successive port during the next successive byte interval and proceeds through the cycle to port 5 and then repeates the cycling, beginning with port 1. It is, therefore, apparent that for each path connected to a port, a byte will be selected every fifth byte interval for application to the common two-way trunk.

Each path from a 9.6 Kbs office channel unit has each byte applied thereto repeated five times. Consequently, one and only one byte of each set of repeated bytes is selected by submultiplexer/demultiplexer 116 and interleaved with bytes applied to other ports. When a 4.8 Kbs office channel unit, such as office channel unit 110, is connected to a port of submultiplexer/demultiplexer 116, two bytes of each set are applied to common two-way trunk 144 since the original byte is repeated 10 times. Similarly, four bytes of each set from a 2.4 Kbs office channel unit, such as office channel unit 112, are applied to common trunk 144 since this original byte is repeated 20 times. The data thus applied to trunk 144 comprises interleaved eight-bit bytes at a 64 Kbs signaling rate, the same signaling rate as the data on cross-office path 143.

Data from trunk 101, demultiplexed by multiplexer/demultiplexer 115 and applied to two-way trunk 144, is again demultiplexed by submultiplexer/demultiplexer 116. As described in detail hereinafter, submultiplexer/demultiplexer 116, under the control of timing signals from the office clock, selects successive eight-bit bytes in successive byte intervals and applies them to successive ones of the five ports. Each port then repeats the eight-bit bytes applied thereto five times and applies the bytes, aligned in the byte intervals, to the two-way path, such as two-way path 142, 137 or 140. Each of the two-way paths thus has applied to it an eight-bit byte organized signal at a 64 Kbs rate.

In general, the operation of submultiplexer/demultiplexer 117 is similar to submultiplexer/demultiplexer 116. Submultiplexer/demultiplexer 117, however, has ten ports and, therefore, needs 10 byte intervals in order to cycle through the ports. Submultiplexer/demultiplexer 117 applies the interleaved bytes from the ten ports to common trunk 145. It is therefore apparent that one byte of each set of repeated bytes from a 4.8 Kbs office channel unit is applied to trunk 145, whereas two bytes of each set of repeated bytes from a 2.4 Kbs office channel unit is applied to trunk 145, whereas two bytes of each set of repeated bytes from a 2.4 Kbs office channel unit is applied to trunk 145. Submultiplexer/demultiplexer 117 demultiplexes data applied thereto from trunk 145 in a manner similar to the manner that submultiplexer/demultiplexer 116 demultiplexes the data, with the exception that it applies successive bytes to 10 ports and each port repeats the byte 10 times for application to the two-way path. The data on the two-way path is consequently arranged in the eight-bit organization at a 64 Kbs signaling rate.

Submultiplexer/demultiplexer 118 is arranged in a manner similar to submultiplexer/demultiplexer 117. Submultiplexer/demultiplexer 118, of course, has 20 ports and therefore requires twenty byte intervals to cycle the ports when multiplexing the data. Only 2.4 Kbs office channel units are connected to the ports and one byte of each set of repeated bytes from the subscriber is applied to trunk 146. When demultiplexing data on trunk 146, submultiplexer/demultiplexer 118 applies successive bytes to the 20 ports and each port repeats each byte twenty times. Eight-bit byte organized data at a 64 Kbs signaling rate is thus applied to the cross-office path, such as path 139.

In accordance with the above description, it is apparent that all of the signaling on the two-way paths is organized into eight-bit bytes having a common alignment and having the same signaling rate. This permits the optional strappings to provide office flexibility, as previously described.

Figure 2:
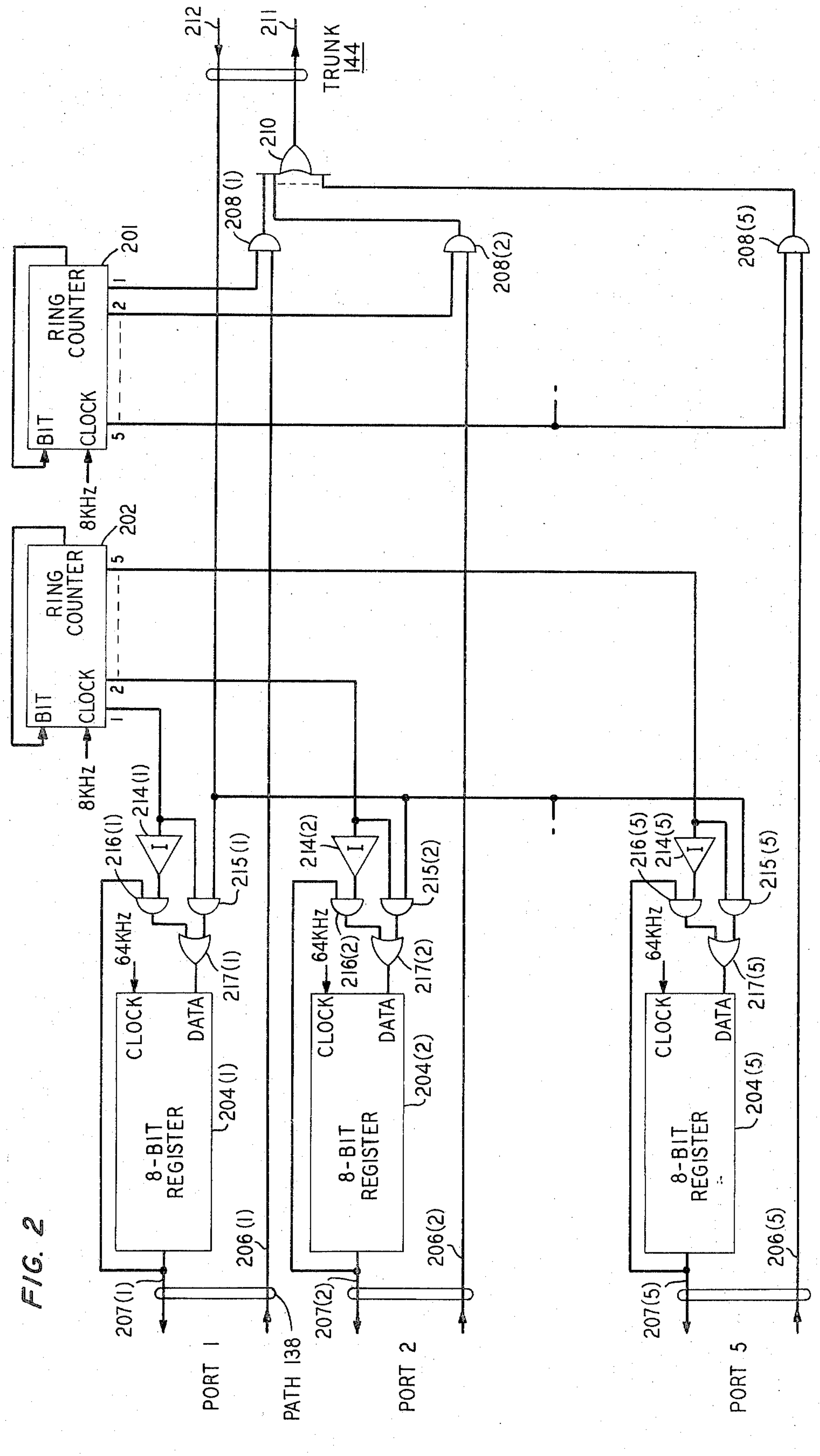
FIG. 2 shows, in schematic form, the various circuits which form a submultiplexer/demultiplexer in accordance with this invention.

The details of a typical submultiplexer/demultiplexer are shown in FIG. 2. The submultiplexer/demultiplexer shown therein is provided with five ports, as indicated on the left side of FIG. 2, and a common trunk, as indicated on the right side. Common to the five ports is ring counter 202. Ring counter 202 is driven by the 8 kHz office reference clock signal, which signal is applied to its CLOCK input. As a result thereof, a bit is stepped through the ring counter, successively energizing its five output leads, identified by the numerals 1 through 5. The bit is then fed back to the BIT input and the cycle is repeated. Associated with the common trunk is ring counter 201, which is also driven by the 8 kHz office reference clock signal and also successively energizes its five output leads, identified by the numerals 1 through 5. We have previously noted that the central office is synchronized with the remote office. Advantageously, the remote office includes a corresponding five-port submultiplexer/demultiplexer. Corresponding channels are connected to the ports of this remote submultiplexer/demultiplexer and the corresponding ring counters are stepped in phase with ring counters 201 and 202 of the submultiplexer/demultiplexer in the local office.

The submultiplexer/demultiplexer shown in FIG. 2 may be considered typical of any of the five-port submultiplexer/demultiplexers in the office. The structures of the 10-port and 20-port submultiplexer/demultiplexers are substantially identical to the five-port submultiplexer/demultiplexer with the exception that the appropriate number of additional ports is included for the 10-port or 20-port submultiplexer/demultiplexers and the corresponding ring counters therein provide a count of ten or twenty.

In the following description of the five-port submultiplexer/demultiplexer shown in FIG. 2, it will be assumed that it comprises submultiplexer/demultiplexer 116 shown in FIG. 1. The common trunk is therefore identified as two-way cross-office trunk 144. Port 1 is connected to two-way cross-office path 138 and port 5 is connected to path 140. Each of the cross-office paths is shown as two leads, with the leads carrying the data from the office channel units to the five ports of the submultiplexer/demultiplexer being identified as leads 206(1) through 206(5) and the leads carrying the data applied thereto by the five ports of the submultiplexer/demultiplexer being identified as leads 207(1) through 207(5). Two-way trunk 144 is shown as two paths, the lead carrying the data from multiplexer/demultiplexer 115 being identified as lead 212 and the lead carrying the data to multiplexer/demultiplexer 115 being identified as lead 211.

Data on paths 206(1) through 206(5) is multiplexed and passed to lead 211 of trunk 144 by way of AND gates 208(1) through 208(5), respectively, and OR gate 210. AND gates 208(1) through 208(5) are successively enabled by the five output leads of ring counter 201. As previously described, ring counter 201 is driven by the 8 kHz office reference clock and as a consequence each of the five output leads is energized for a byte interval. When the first output lead is energized AND gate 208(1) is enabled and, for this byte interval, the byte applied to lead 206(1) is passed therethrough and then through OR gate 210 to lead 211 of trunk 144. The next 8 kHz clock pulse advances counter 201 to AND gate 208(2) and disables AND gate 208(1). As a consequence, the byte on lead 206(2), aligned within this next byte interval, is passed through the enabled AND gate and OR gate 210 to lead 211. In this manner incoming bytes to successive ones of the ports are applied, interleaved, to trunk 144. The data received on lead 212 is distributed to eight-bit registers 204(1) through 204(5), each of the registers being associated with a corresponding one of the ports. The distribution of the data is controlled by ring counter 202. As described above, ring counter 202 is driven by the 8 kHz office reference clock. Each of the five leads of ring counter 202 are, therefore, energized for a byte interval. When the first output lead of ring counter 202 is energized, AND gate 215(1) is enabled and AND gate 216(1) is concurrently disabled by way of inverter 214(1). The byte on lead 212 is, therefore, passed through AND gate 215(1) and OR gate 217(1) and inserted into eight-bit registers 204(1) by way of input terminal DATA. Eight-bit register 204(1) shifts the data therethrough under control of shift pulses provided by the 64 kHz office reference clock applied to the input terminal CLOCK. During the byte interval eight shift pulses are applied to register 204(1), filling the register with the eight bits of the byte on lead 212.

At the termination of the byte interval, ring counter 202 is advanced, its first output lead is de-energized and its second output lead is energized. Its second output lead provides the insertion of the byte on lead 212 into eight-bit register 204(2) in the same manner as the previous byte was inserted in eight-bit register 204(1). The de-energization of the first output lead 1 of ring counter 202 disables AND gate 215(1) and enables AND gate 216(1).

During the second byte interval a second set of eight shift pulses is applied to register 204(1). The eight-bit byte stored in the register during the first byte interval is shifted out onto lead 207(1) and thus passed out through port 1 and path 138 to the office channel unit. At the same time, the eight bits of the byte are recirculated back through AND gate 216(1) and OR gate 217(1) and reinserted back into register 204(1). This process is then repeated for the third, fourth and fifth byte intervals. Ring counter 202 is thus recycled to re-energize its first output lead. The byte in register 204(1) is applied to lead 207(1) for the fifth time. AND gate 216(1) is now disabled to preclude the recirculation of the byte. AND gate 215(1) is enabled, however, so that the byte on trunk 144 is inserted in the register. Thus, port 1 selects one of the five interleaved bytes on lead 212, repeats the byte five times and passes it to lead 207(1). Each of the other ports operates in substantially the same manner to accept another one of the interleaved bytes from lead 212, repeating the byte five times and passing it out through the output port.

Figure 3:
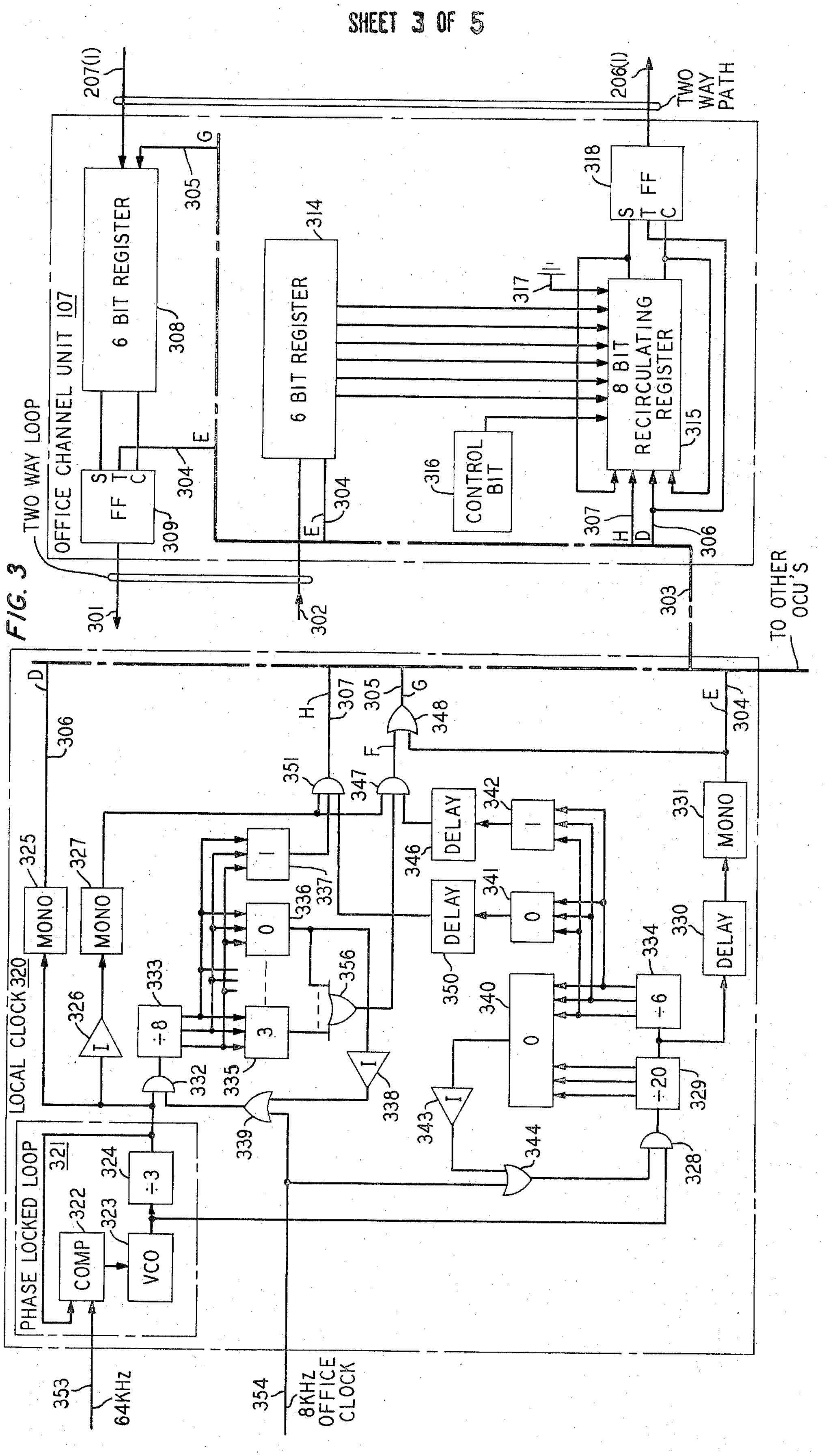
FIG. 3 shows, in schematic forn, the various circuits which form a line terminal (hereinafter called an office channel unit) and the various circuits which form a local clock circuit common to a group of office channel units, in accordance with this invention.

The details of an office channel unit are shown in FIG. 3. This office channel unit is specifically arranged to terminate a two-way loop extending to a 9.6 Kbs subscriber. As disucssed hereinafter, the office channel units terminating other signaling rate subscribers are arranged in a similar manner to the 9.6 office channel unit.

As seen in FIG. 3, the 9.6 office channel unit is identified as office channel unit 107, previously discussed relative to FIG. 1. The two-way cross-office path therefore extends to submultiplexer/demultiplexer 116, FIGS. 1 and 2, and comprises outgoing path 206(1) and incoming path 207(1). The two-way loop extending to the subscriber comprises outgoing path 301 and incoming path 302.

Figure 4A:
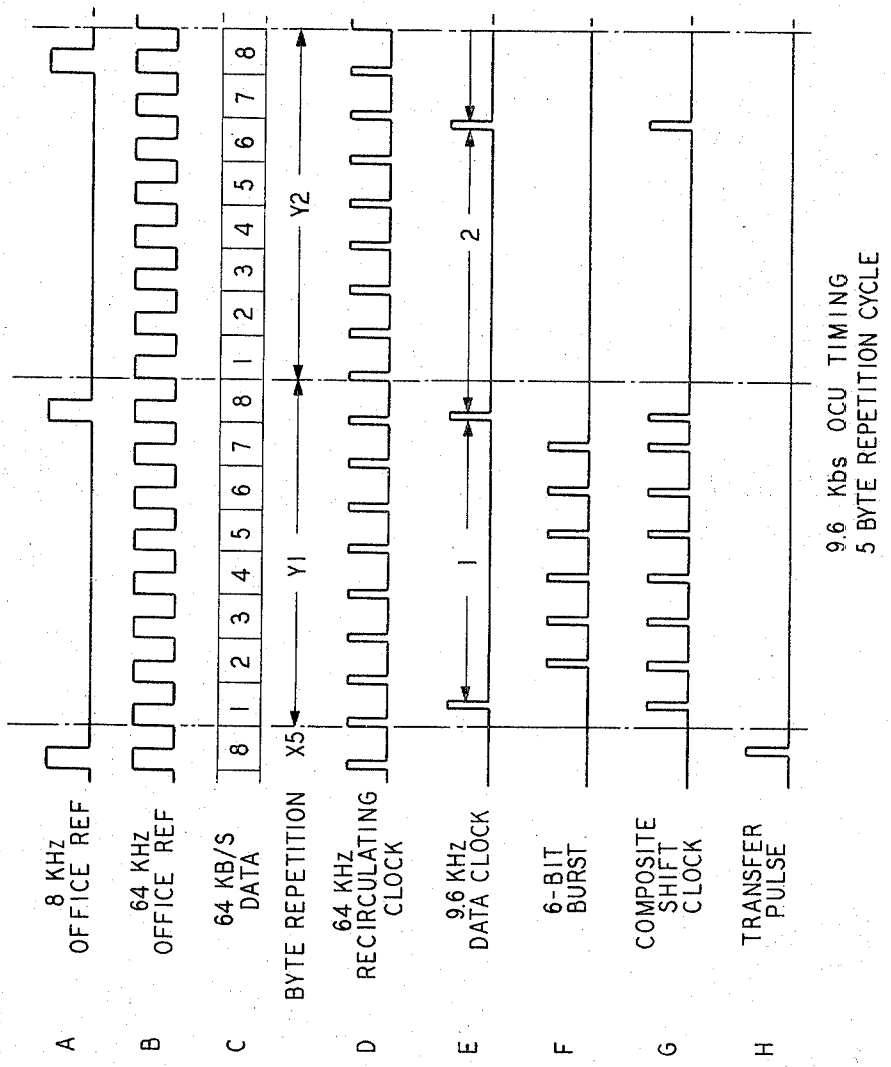
Figure 5:
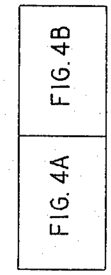
FIG. 5 comprised of FIGS. 4A and 4B depict the various waveforms of the office clock signals and the data signal outputs of the submultiplexer/demultiplexers and office channel units.
Figure 4B:
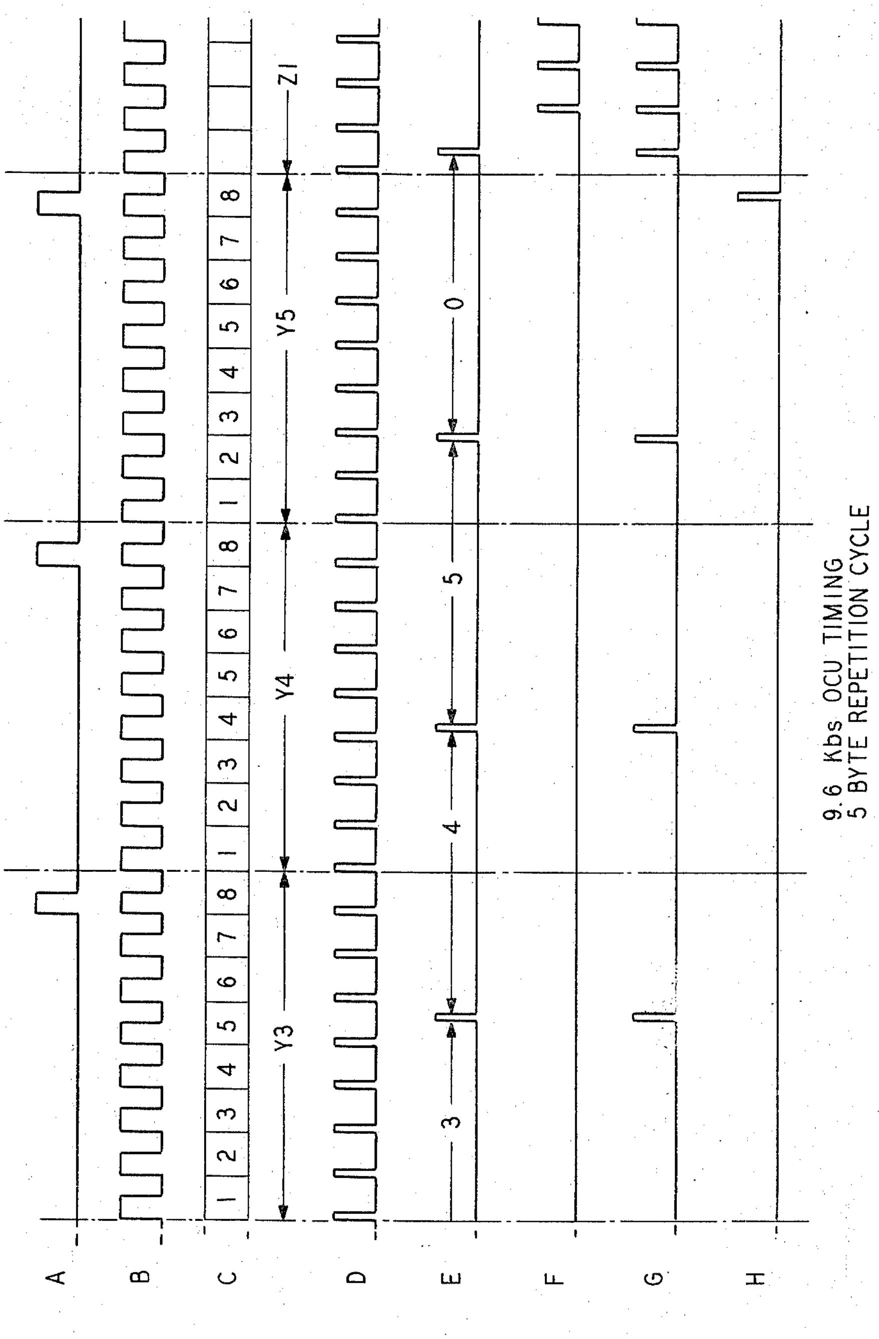

Incoming data derived from the submultiplexer/-demultiplexer over path 207(1) is clocked into six-bit (six-stage) register 308 and shifted therethrough by a "composite shift clock" applied to lead 305, the timing wave thereof being identified as timing wave G, shown in FIGS. 4A and 4B. The output of register 308 is clocked into flip-flop 309 by a "9.6 kHz data clock" applied to lead 304, the timing wave of this latter clock being identified as timing wave E in FIGS. 4A and 4B. The output of the flip-flop 309 is then passed to lead 301 of the two-way loop.

Data from the subscriber received over lead 302 is clocked into and shifted through six-bit (six-stage) register 314 by the 9.6 kHz data clock on lead 304. The data information in six-bit register 314 is transferred, in parallel, to eight-bit (eight-stage) recirculating register 315, the "transfer pulse" being provided to lead 307 and the timing wave thereof being identified as timing wave H in FIGS. 4A and 4B. The data in eight-bit recirculating register 315 is shifted by a 64 kHz recirculating clock on lead 306, the timing wave thereof being identified as timing wave D in FIGS. 4A and 4B. The output data of register 315 is clocked into flip-flop 318 by the 64 kHz recirculating clock pulses on lead 306 and, in addition, is recirculated back into the initial or first stage of register 315. The output of flip-flop 318 is applied to lead 206(1) of the two-way cross-office path.

The several clock waves described above are generated, in a manner described in detail hereinafter, by a local clock circuit, generally shown as block 320. The 64 kHz recirculating clock (timing wave D) comprises a pulse train which is phase locked to the 64 kHz office reference clock. As seen in FIGS. 4A and 4B, each of the 64 kHz recirculating clock pulses is coincident in time with a positive transition of the 64 kHz office reference clock. The 9.6 kHz data clock (timing wave E) is generated by producing sets of six pulses. The first pulse of each set is phase locked to an 8 kHz office reference clock pulse and the 9.6 kHz clock pulses are delayed so that the first two pulses of each set appear in the byte interval identified as byte interval $Y_1$ in FIG. 4A.

For purposes of the following discussions, it is noted that the interpulse interval between the first and second pulses of each six-pulse set of the 9.6 kHz data clock is identified as interval 1. Succeeding intervals are identified as intervals 2 through 5 and the sixth interval is identified as interval 0 (as seen in FIG. 4B). It is also noted that the first bit of each of the cross-office bytes (wave C) is identified as bit 1 in FIG. 4A. Succeeding bits are identified as bits 2 through 8.

Each transfer pulse (wave H) occurs at the midpoint of those bit 8's of the bytes which appear on the two-way path during interval 0 of the 9.6 kHz data clock. The composite shift clock (wave G) comprises a composite of the 9.6 kHz data clock pulses and a six-pulse burst shown as wave F in FIGS. 4A and 4B. As described in detail hereinafter, the six-pulse burst is derived from those negative transitions of the 64 kHz office reference clock which occur at the midpoints of bits 2 through 7 in the byte of the 64 Kbs data appearing on the two-way path during the first byte interval, such as interval $Y_1$. Composite shift clock wave G therefore comprises an eight-pulse burst during the first byte interval (such as byte interval $Y_1$) and a sequence of four more pulses (from the 9.6 kHz data clock) in the subsequent four byte intervals.

Assume now that data is being received from the submultiplexer/demultiplexer over lead 207(1). It was previously disclosed that the data destined for the subscriber constituted bits 2 through 7 of the data byte. In addition, the byte is repeated five times by the submultiplexer/demultiplexer. The useful data that is to be forwarded to the subscriber is therefore limited to bits 2 through 7 of each fifth byte, such as the byte in interval $Y_1$. All other data is to be discarded and will hereinafter be referred to as "garbage."

Assume now that the first pulse of the eight-bit burst of the composite shift clock appears on lead 305. The data on lead 207(1) is shifted into the first stage of six-bit register 308, storing "garbage" in the first stage. The second pulse of the eight-pulse burst of the composite shift clock gates bit 2 of the byte into the first stage of register 308 and concurrently shifts the "garbage" into the second stage. Thereafter, the third, fourth, fifth, sixth and seventh pulses of the eight-pulse burst gate in the third, fourth, fifth, sixth and seventh bits of the byte into register 308, shifting the bits through the register at the same time. This seventh pulse of the burst therefore fills register 308 with bits 2 through 7 of the byte, the "garbage" being discarded from the final stage.

The eighth pulse of the eight-pulse burst of the composite shift clock coincides in time with (or immediately follows) the second pulse of the 9.6 kHz data clock (which pulse initiates interpulse interval 2). The 9.6 kHz data clock pulse is applied to the TOGGLE input of flip-flop 309, while the output of the final stage of register 308 is applied, double rail, to the SET and CLEAR inputs of the flip-flop. Accordingly, bit 2 in the final stage of register 308 is toggled into flip-flop 309. The composite shift clock pulse concurrently shifts bit 3 of the byte into the last stage while gating "garbage" from path 207(1) into the first stage of register 308.

During the 9.6 kHz clock interpulse interval 2, bit 2 of the cross-office byte is applied to lead 301 of the two-way loop by flip-flop 309. At the termination of this interval, bit 3 of the cross-office byte is toggled into flip-flop 309 by the 9.6 kHz clock pulse. The composite shift clock pulse moves up bits 4 through 7 of the cross-office bit, shifting byte 4 into the final stage of register 308 and gating "garbage" into the first two stages. For each of the succeeding fourth through sixth 9.6 kHz data clock pulses, the pulses, the fourth through sixth bits of the cross-office byte are similarly toggled into flip-flop 309. The seventh bit of the cross-office byte is now shifted into the final stage of six-bit register 308 and the first five stages are filled with "garbage."

The next pulse of the 9.6 kHz data clock, following interval 0, constitutes the first pulse of the new cycle. This toggles the seventh bit of the cross-office byte into flip-flop 309. The corresponding pulse of the composite shift clock now completely fills six-bit register 308 with "garbage." (It is to be noted, however, that this first pulse of the composite shift clock may be blocked out as unnecessary to the proper operation of six-bit register 308). The composite shift clock pulses, starting with the pulse terminating interval 0, constitute the eight-pulse burst. As previously described, this burst reads into register 308 bits 2 through 7 of the byte, discarding the "garbage" preceding the bits. The new byte is thereafter read out to the subscriber rate in the same manner as the readout of the previous byte. Accordingly, as described above, data bits 2 through 7 of each fifth cross-office byte are inserted in register 308 and read out to the subscriber at the 9.6 kHz rate.

Data received from the 9.6 kHz customer over lead 302 is clocked into six-bit register 314 by the 9.6 kHz data clock. It is apparent from an inspection of timing wave E in FIGS. 4A and 4B that six bits are inserted in register 314 during five cross-office byte intervals.

Near the termination of the fifth byte interval $Y_5$ a transfer pulse is provided to lead 307. This gates the six bits of data in register 314 into stages 2 through 7 of recirculating register 315. At the same time, a phase bit which is derived from a 0 bit on lead 317 is inserted into the first stage and a flag bit is inserted into the last stage of register 315. The flag bit is provided by control bit generator 316, which generator operates to provide an appropriate network control bit in a manner not shown. More specifically, control bit generator 316 may apply a constant 1 bit (positive potential) or a 0 bit (ground potential) or, alternatively, may respond to external means to alternatively apply a 1 or 0 bit in accordance with the external control. In any event, the transfer pulse shifts eight bits into the eight stages of recirculating register 315, which eight bits will constitute the repeated cross-office byte.

The 64 kHz recirculating clock on lead 306 sequentially shifts the eight bits to the double rail output of register 315, toggling the bits into flip-flop 318. The output of register 315 is concurrently recirculated back into the first stage of the register.

Eight pulses of the 64 kHz recirculating clock occur during each byte interval. During the first byte interval $Y_1$, the eight bits in register 315 are therefore toggled into flip-flop 318 and applied to path 206(1) of the two-way path. In this manner, the eight bits are organized into a byte and applied to path 206(1) during the byte interval $Y_1$ as shown in timing wave C in FIG. 4A.

At the termination of the byte interval the eight bits have been applied to path 206(1) and have also been recirculated back through register 315, with the 0 bit (phasing bit) back in the final stage. During the second byte interval ($Y_2$), the third byte interval ($Y_3$), the fourth byte interval ($Y_4$) and the fifth byte interval ($Y_5$) the eight bits are again toggled into flip-flop 318 to be applied to lead 206(1) and recirculated back through the first stage in the same manner as the bits of the byte are passed to lead 206(1) and recirculated during byte interval $Y_1$. At the same time, the next six bits of data from the subscriber are inserted in register 314.

Near the termination of the byte interval $Y_5$ the transfer pulse overwrites these next six bits into stages 2 through 6 of recirculating registers 315. The new byte is thus organized and repeatedly applied to the two-way path during the succeeding five byte intervals.

A 64 Kbs customer's office channel unit need only retime the data passing therethrough. In accordance therewith these office channel units need only include flip-flops corresponding to flip-flops 309 and 318, together with the 64 kHz recirculating clock to toggle the data into the flip-flops. The 4.8 Kbs and 2.4 Kbs office channel units are arranged in substantially the same manner as the 9.6 office channel unit, with the exception that the 9.6 kHz data clock is removed and a 4.8 or 2.4 kHz data clock is substituted therefor and, in addition, one eight-pulse burst of the composite shift clock and one transfer pulse occur for each 10 or 20 byte interval, respectively, instead of for each five byte interval.

As previously mentioned, the clock signals produced by each local clock, such as clock 320, are phase locked with the 64 kHz and/or the 8 kHz office reference clocks. The 64 kHz office clock is received on lead 353, which lead extends to phase-locked loop 321. Phase-locked loop 321 comprises comparator 322, voltage-controlled oscillator 323 and divide-by-3 downcounter 324. Voltage-controlled oscillator 323 includes a high frequency oscillator, together with downcounters which provide, at the output thereof, a 192 kHz square wave. This 192 kHz wave output is applied to divide-by-3 downcounter 324 and to AND gate 328.

Divide-by-3 downcounter 324 produces at the output thereof a 64 kHz square wave. The wave is applied, in parallel, to one input of comparator 322, to monopulser 325, to inverter 326 and to AND gate 332. The other input of comparator 322 is lead 353 which carries the 64 kHz office reference clock. Comparator 322 therefore applies an error voltage to voltage-controlled oscillator 323 when the inputs thereof are not phase locked to each other. This error voltage modifies the output frequency of voltage-controlled oscillator 323, modifying in turn the output frequency of downcounter 324 to reduce, in turn, the phase error. Phase-locked loop 321 therefore operates to provide at one output thereof a 192 kHz wave and at a second output thereof a 64 kHz wave, the latter wave being locked in phase with the 64 kHz office reference clock.

The 64 kHz square wave derived from phase-locked loop 321 is utilized to derive the 64 kHz recirculating clock which is identified as wave D in FIGS. 4A and 4B. This is accomplished by monopulser 325, which provides an output pulse at each positive transition of the 64 kHz square wave. The output pulses of monopulser 325 are passed to lead 306, which lead conveys the 64 kHz recirculating clock pulses to the office channel units, as previously described.

The 64 kHz square wave provided by phase-locked loop 321 also is utilized in the derivation of the six-pulse burst (wave F) and the transfer pulse (wave H). The 64 kHz wave is applied to inverter 326 and the inversion of the wave is passed to monopulser 327. The output of monopulser 327 comprises a pulse for each negative transition of the 64 kHz square wave. This output is passed to gates 347 and 351, which, as described hereinafter, are involved in the production of the six-pulse burst and the transfer pulse.

The 9.6 kHz data clock (wave E) is derived from the 192 kHz wave output of phase-locked loop 321. As previously noted, this wave output is passed to AND gate 328. Assuming that AND gate 328 is enabled, the 192 kHz wave is passed therethrough to divide-by-20 downcounter 329. The resultant output wave of downcounter 329 is therefore a 9.6 kHz square wave. This square wave is passed through delay circuit 330 and monopulser 331. The output of monopulser 331 comprises a pulse for each positive transition of the delayed 9.6 kHz square wave. The output of monopulser 331 is connected to gate 348 and to lead 304. This output constitutes the 9.6 kHz data clock passed to the office channel units.

As previously discussed, the 9.6 kHz data clock constitutes sets of six pulses wherein the first pulse of each set is "phase locked" with the eight kHz office reference clock. The phase locking is accomplished by downcounter 329 together with divide-by-6 counter 334, 0-count detector 340 and AND gate 328 (downcounter 334 provides other functions, described later). 0-count detector 340 comprises AND gate circuitry which provides an energizing potential at its output when the several stages of downcounters 329 and 334 indicate that the composite of the two downcounters is in the 0 count. Therefore, when downcounters 329 and 334 are in the composite 0 count, inverter 343 removes the application of an enabling potential through OR gate 344 to AND gate 328. AND gate 328 is therefore disabled until a pulse is applied to lead 354 by the 8 kHz office clock. This pulse on lead 354 is passed through OR gate 344 to enable AND gate 328. With AND gate 328 enabled, the 192 kHz square wave is passed through downcounter 329, the count of the downcounter is advanced (to 1), 0-count detector 340 removes the enabling potential applied to inverter 343 and the inverter, in turn, applies an enabling potential through OR gate 344 to AND gate 328. Accordingly, to initiate the count of downcounters 329 and 334 from their 0 count, it is necessary that an 8 kHz office clock pulse appears on lead 354.

After advancing from the 0 count, downcounter 329 proceeds to count the 192 kHz square wave, producing a cycle of the 9.6 kHz square wave and advancing downcounter 334 for each twenty counts of the 192 kHz square wave. After six of these cycles, the cumulative count returns to 0 and the enabling of AND gate 328 can be provided only by the 8 kHz office clock. In this manner, each sixth cycle of the 9.6 kHz square wave is phase locked to each fifth pulse of the 8 kHz office reference clock, aligning each first pulse in sets of six with each fifth pulse of the reference clock. The delay provided by delay circuit 330 is arranged to be sufficient to align the first and second pulses in the set to frame the six-pulse burst (wave F).

The output count of downcounter 334 is also provided to 0-count detector 341 and 1-count detector 342. In general, it is the function of divide-by-6 downcounter 334 to define the six interpulse intervals of the 9.6 kHz wave. 1-count detector 342 identifies the first interpulse interval. Delay circuit 346 provides delay corresponding to delay circuit 330. Delay circuit 346 thereby provides an enabling potential to partially enable AND gate 347 during the first interpulse interval of the 9.6 kHz data clock.

0-count detector 341 detects the 0 (or six) count of downcounter 334. During this interval an enabling potential is applied to delay circuit 350 and delay circuit 350, in turn, provides an enabling potential to partially enable AND gate 351 during the 0 interpulse interval of the 9.6 kHz data clock.

The various bit intervals of cross-office bytes are identified by divide-by-8 downcounter 333. The input to downcounter 333 is provided by the 64 kHz square wave output of phase-locked loop 321 which is passed through AND gate 332. The various counts of downcounter 333 are detected by 1-count detector 337 and 3- through 0-count detectors, the first and last thereof shown as blocks 335 and 336.

The output of 0-count detector 336 is applied through inverter 338 to OR gate 339. The other input to OR gate 339 extends to the 8 kHz office clock by way of lead 354. The output of OR gate 339, in turn, is connected to the enabling input of AND gate 332. AND gate 332 is therefore enabled by 0-count detector 336 via inverter 338 during seven counts of downcounter 333. When the count of downcounter 333 is at 0, however, the enabling of AND gate 332 must be provided by the 8 kHz office clock. Downcounter 333 is therefore phase locked to the 8 kHz office clock.

Referring to FIGS. 4A and 4B, it can be seen that the 8 kHz clock pulse occurs during bit 8 interval of the cross-office byte. Therefore, downcounter 333 is in the count of 1 during bit 8 interval, in the count of 2 during the bit 1 interval, and in the counts of 3 to 0 during the bit 2 to 7 intervals. The composite counts of 3 through 0 derived from count detectors 335 through 336 thereby define the bit 2 to 7 intervals of the cross-office byte. Accordingly, during this six-bit interval one of the count detectors 335 through 336 provides an energizing potential through OR gate 356 to AND gate 347.

It was previously disclosed that AND gate 347 was partially enabled by delay circuit 346 during the first interpulse interval of the 9.6 kHz data clock. AND gate 347 is therefore enabled during the bit 2 to bit 7 intervals which occur during the first interpulse interval of the 9.6 kHz data clock, these being the bits in the first byte which is on the cross-office path during interval $Y_1$.

AND gate 347, enabled, passes the output of monopulser 327 to OR gate 348. The output of monopulser 327 comprises pulses coinciding with each negative transition of the 64 kHz square wave output of phase-locked loop 321, which pulses coincide with the theoretical midpoints of the bits. AND gate 347 therefore passes to OR gate 348 a six-pulse burst, the pulses occurring at the midpoints of bits 2 through 7 of the first byte. OR gate 348 combines the outputs of AND gate 347 and monopulser 331, thus combining the 9.6 kHz data clock wave and the six-pulse burst to form the composite shift clock previously identified as wave G. This wave is passed to lead 305 and then to the office channel units.

The output of 1-count detector 337 is provided to AND gate 351, as previously noted. AND gate 351 is therefore partially enabled during the first count, which occurs during the eight bit of the cross-office byte. As previously described, AND gate 351 is also partially enabled by the output of delay circuit 350, which enablement occurs during interpulse interval 0 of the 9.6 kHz data clock. AND gate 351 is therefore enabled, during that eighth bit of the byte which occurs during the 0 interpulse interval of the 9.6 kHz clock, to pass therethrough the output of monopulser 327. The output of monpulser 327 constitutes pulses coinciding with negative transitions of the 64 kHz square wave derived from phase-locked loop 321 and AND gate 351 passes a pulse therethrough, when enabled. This comprises the transfer pulse (wave H) which is applied via lead 307 to the office channel units.

Output leads 304 through 307 of local clock 320 are passed through cable 303 to the various 9.6 Kbs office channel units, as previously described. Advantageously, the 64 kHz recirculating clock signals on output lead 306 are also passed to the 64 Kbs office channel units. The 4.8 Kbs and 2.4 Kbs office channel units require 4.8 kHz and 2.4 kHz data clocks, respectively, together with eight-pulse bursts of the composite shift clock and transfer pulses which occur every 10th and 20th byte interval. Local clocks to provide these waves are individually arranged substantially in the same manner as clock 320, with the exception that the local clock for 4.8 Kbs office channel units advantageously includes a divide-by-2 downcounter at the output of the divide-by-20 downcounter corresponding to downcounter 329 in local clock 320. The output of the divide-by-2 counter would then be delayed and pulses would be generated to coincide with each positive transition to provide the 4.8 kHz data clock signal. The 0-count detector corresponding to detector 340 examines the cumulative count in the stages of the divide-by-20, divide-by-2 and divide-by-6 downcounters and the 0- and 1-count detectors corresponding to detectors 341 and 342 monitor the cumulative count in the stages of the divide-by-2 and divide-by-6 downcounters. In a similar manner, a local clock for 2.4 Kbs office channel units is provided by substituting a divide-by-4 downcounter for the divide-by-2 downcounter of the 4.8 Kbs office channel unit local office clock.

Although a specific embodiment of this invention has been shown and described, it will be understood that various modifications may be made without departing from the spirit of this invention.

What is claimed is:

1. A multiplexing system comprising:

a plurality of input terminals for providing data signals, means for repeating each of the data signals from each of the terminals a number of times, the number being at least equal to the number of terminals, to achieve a high speed signaling rate, the repeating means including means for aligning in time each of the repeated data signals with repeated data signals from the other terminals, and means for interleaving one of each of the number of repeated data signals from one of the terminals with the repeated data signals from the other terminals.

2. A multiplexing system in accordance with claim 1 wherein each of the data signals provided by the terminals comprises a data byte, each of the data bytes comprises a plurality of serial data bits, and wherein the aligning means further includes means for aligning each of the serial bits in each of the bytes with corresponding bits in bytes from other terminals.

3. A multiplexing system in accordance with claim 2 wherein each of the terminals includes means for receiving incoming data bits and means for assembling the incoming data bits into the data bytes.

4. A multiplexing system in accordance with claim 3 wherein the assembling means further includes means for stuffing locally generated bits into each data byte whereby each byte consists of assembled incoming data bits and stuffed locally generated bits.

5. A data signal multiplexing system comprising:

a plurality of input terminals, each of the terminals conveying data signals at a signaling rate which differs from the signaling rate of other ones of the terminals, means associated with each of the terminals, for repeating each of the data signals from the terminal a number of times, the number being at least equal to and integrally related to the number of terminals and differing for each signaling rate in order to achieve a common high speed signaling rate, the repeating means including means for aligning in time each of the repeated data signals with repeated data signals from the other terminals, and means for sequentially scanning the repeated data signal outputs of the several repeating means at a scanning rate equal to the common high speed signaling rate.

6. A multiplexing system in accordance with claim 5 wherein each of the data signals provided by the terminals comprises a data byte, each of the data bytes comprises a plurality of serial data bits, and the signaling rate defines the repetition rate of the repeated bytes, and wherein the aligning means further includes means for aligning each of the serial bits in each of the bytes with corresponding bits in bytes from other terminals.

7. A multiplexing system in accordance with claim 6 wherein each of the terminals includes means for receiving incoming data bits and means for assembling the incoming data bits into the data bytes.

8. A multiplexing system in accordance with claim 7 wherein the assembling means further includes means for stuffing locally generated bits into each data byte whereby each byte consists of assembled incoming data bits and stuffed locally generated bits.

9. A data signal multiplexing system comprising:

a plurality of input terminals providing data signals at one of at least two different signaling rates, one rate being a fixed multiple of the other rate, at least two groups of ports, the number of ports in one group being the fixed multiple of the number of ports in the other group, means associated with each one rate terminal for repeating the data signals a plurality of times equal to the number of ports in the other group and means associated with each other rate terminal for repeating the data signals a plurality of times equal to the number of ports in the one group, whereby a common high speed signaling rate is achieved, means for applying the output of each of the repeating means associated with one rate terminals to one of the ports in the other group, means for applying the output of at least one of the repeating means associated with another rate terminal to one of the ports in the other group and means for applying the outputs of other ones of the repeating means associated with other rate terminals to the ports in the one group, and means individual to each of the groups of sequentially scanning the ports in the group at a scanning rate equal to the common high speed signaling rate.

10. A multiplexing system in accordance with claim 9 and further including means for aligning in time the data signal outputs of the repeating means associated with the one rate and the other rate terminals.

11. A multiplexing system in accordance with claim 10 wherein each of the data signals provided by the terminals comprises a data byte, each of the data bytes comprises a plurality of serial data bits, and the signaling rate defines the byte repetition rate, and wherein the aligning means further includes means for aligning each of the serial bits in each of the bytes with corresponding bits in bytes from other terminals.

12. A multiplexing system in accordance with claim 11 wherein each of the terminals includes means for receiving incoming data bits and means for assembling the incoming data bits into the data bytes.

13. A multiplexing system in accordance with claim 12 wherein the assembling means further includes means for stuffing locally generated bits into each data byte whereby each byte consists of assembled incoming data bits and stuffed locally generated bits.

14. A multiplexing system in accordance with claim 9 and further including means for multiplexing the signals scanned by the several sequential scanning means.

15. A multiplexing system in accordance with claim 14 wherein there is included a further terminal providing data signals at the common high speed signal rate and wherein the multiplexing means includes means for multiplexing the signals provided by the further terminal with the signals scanned by the several sequential scanning means.

16. A time-division multiplex system having a signaling format consisting of repetitive time frames, each time frame having $n$ time slots, and including, a plurality of terminals providing signals at a signaling rate which is the same as the time frame repetition rate, means associated with each of the terminals for repeating each signal $n$ times and for aligning successive ones of the repeated signals with successive ones of the time slots, and means responsive to each of the terminal repeating and aligning means for inserting into one of the time slots in each of the time frames the repeated data signal aligned therewith.

17. A time-division multiplex system, in accordance with claim 16, and further including, other terminals providing signals at a signaling rate which is $1/m$ times the frame repetition rate, and means associated with each of the other terminals for repeating each signal $m \times n$ times and for aligning successive ones of the repeated signals with successive ones of the time slots.

18. A time-division multiplex system, in accordance with claim 17, and further including, other means responsive to at least one of the other terminal repeating and aligning means for inserting into one of the time slots in each of the time frames the repeated data signal aligned therewith.

19. A time-division multiplex system, in accordance with claim 17, and further having another signaling format consisting of other repetitive time frames, each having $n \times m$ time slots individually aligned with and having the same duration as the time slots of the $n$ time slot time frames, and further including, means responsive to each of certain ones of the other terminal repeating and aligning means for inserting into one of the time slots in each of the other time frames the repeated data signal aligned therewith.

20. A time-division multiplex system, in accordance with claim 19, and including, means for multiplexing the signals inserted into the time slots of the time frames with the signals inserted into the time slots of the other time frames.

* * * * *